US009453856B2

United States Patent
Sakai (10) Patent No.: US 9,453,856 B2
(45) Date of Patent: Sep. 27, 2016

(54) SCANNING PROBE MICROSCOPE AND SCANNING PROBE MICROSCOPY (71) Applicant: OLYMPUS CORPORATION, Shibuya-ku, Tokyo (JP)

(72) Inventor: Nobuaki Sakai, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/874,088

(22) Filed: Oct. 2, 2015

(65) Prior Publication Data
US 2016/0025770 A1 Jan. 28, 2016

Related U.S. Application Data (63) Continuation of application No. PCT/JP2014/057158, filed on Mar. 17, 2014.

(30) Foreign Application Priority Data

Apr. 5, 2013 (JP) ................................. 2013-079631

(51) Int. Cl.
G01Q 20/00 (2010.01)
G01Q 60/32 (2010.01)

(52) U.S. Cl.
CPC .............. G01Q 20/00 (2013.01); G01Q 60/32 (2013.01)

(58) Field of Classification Search
USPC .................................................... 850/1, 5, 6
See application file for complete search history.

(56) References Cited

U.S. PATENT DOCUMENTS

| 2008/0229813 A1 | 9/2008 | Kitamura |
| 2008/0307864 A1 | 12/2008 | Uchihashi et al. |
| 2012/0151637 A1 | 6/2012 | Fukuma et al. |
| 2014/0223613 A1 | 8/2014 | Sakai |

FOREIGN PATENT DOCUMENTS

| JP | 2005331283 A | 12/2005 |
| JP | 2008232984 A | 10/2008 |
| WO | 2007072706 A1 | 6/2007 |
| WO | 2010023811 A1 | 3/2010 |
| WO | 2013054715 A1 | 4/2013 |

OTHER PUBLICATIONS

International Search Report (ISR) dated Jun. 10, 2014 issued in International Application No. PCT/JP2014/057158.
International Preliminary Report on Patentability (IPRP) including Written Opinion (in English) dated Oct. 15, 2015, issued in parent International Application No. PCT/JP2014/057158.

*Primary Examiner* — Nicole Ippolito
*Assistant Examiner* — Hanway Chang
(74) *Attorney, Agent, or Firm* — Holtz, Holtz & Volek PC (57) ABSTRACT

A scanning probe microscope includes a vibration unit to vibrate the cantilever on the basis of a vibration signal, a displacement detection unit to output a displacement signal indicating the displacement of the cantilever, a phase adjustment unit to provide a phase offset to a phase difference between the vibration signal and displacement signal, a phase signal generating unit to generate a phase signal including information regarding the phase difference and phase offset, and a control unit to control the distance between the probe and sample on the basis of the phase signal. The phase adjustment unit combines a first phase amount that cancels an initial phase difference exiting in a condition where the probe and sample are out of contact, with a second phase amount equal to or more than (0 [rad]) and less than or equal to ($\pi/2$ [rad]) and provides a combined amount to the phase difference.

12 Claims, 10 Drawing Sheets

SCANNING PROBE MICROSCOPE AND SCANNING PROBE MICROSCOPY

CROSS-REFERENCE TO RELATED APPLICATIONS

This application is a Continuation Application of PCT Application No PCT/JP2014/057158, filed Mar. 17, 2014, and based upon and claiming the benefit of priority from Japanese Patent Application No. 2013-079631, filed Apr. 5, 2013, the entire contents of which are incorporated herein by reference.

BACKGROUND OF THE INVENTION

1. Field of the Invention

The present invention relates to a scanning probe microscope and a scanning probe microscopy.

2. Description of the Related Art

A scanning probe microscope (SPM) is a generic term for scanning microscopes, which acquire information regarding the surface of a sample while scanning with a mechanical probe to map and display the information. The SPM includes a scanning tunneling microscope (STM), an atomic force microscope (AFM), a scanning magnetic force microscope (MFM), and a scanning near field optical microscope (SNOM).

Among the SPMs, the AFM is most widely used, and comprises, as the main elements, a cantilever having a mechanical probe at its free end, an optical displacement sensor to detect the displacement of the cantilever, and a scanning mechanism to scan the mechanical probe relative to a sample. As the optical displacement sensor, an optical-lever-type optical displacement sensor is most widely used because of its high displacement detection sensitivity despite its simple construction. This optical-lever-type optical displacement sensor applies a light beam having a diameter of several, μm to several ten μm onto the cantilever, detects by, for example, a two-segment photodetector, a change of the reflection direction of the reflected light depending on the change of the curve of the cantilever, and outputs an electric signal that reflects the operation of the mechanical probe at the free end of the cantilever. The AFM scans a relative position between the mechanical probe and the sample with the scanning mechanism in the XY-directions while controlling the relative distance between the mechanical probe and the sample in a Z-direction so that the output of the optical displacement sensor is constant, thereby mapping configurations on the sample surface and then displaying the configurations on a monitor of a computer.

The AFM often uses a method (AC mode) of vibrating the cantilever and detecting, from its vibration characteristics, an interaction operating between the sample and the probe. This is attributed to such an advantage that weaker force operating between the sample and the probe can be maintained than in a normal method (called a contact mode). This AC mode AFM detects one of an amplitude change and a phase change in the vibration, that is, the displacement of the cantilever caused by the interaction operating between the sample and the probe, and measures the surface shape of the sample in accordance with the detection result.

Jpn. Pat. Appln. KOKAI Publication No. 2008-232984 discloses one of the AC mode AFMs of this type. This AC mode AFM is configured to be able to switch and detect one of the amplitude change and the phase change.

BRIEF SUMMARY OF THE INVENTION

A scanning probe microscope includes a vibration unit to vibrate the cantilever on the basis of a vibration signal, a displacement detection unit to detect the displacement of the cantilever and output a displacement signal indicating the displacement, a phase adjustment unit to provide a phase offset to a phase difference between the vibration signal and the displacement signal, a phase signal generating unit to generate a phase signal including information regarding the phase difference between the vibration signal and the displacement signal and the phase offset, and a control unit to control the distance between the probe and the sample on the basis of the phase signal. The phase adjustment unit combines a first phase amount that cancels an initial phase difference between the vibration signal and the displacement signal exiting in a condition where the probe and the sample are out of contact, with a second phase amount equal to or more than (0 [rad]) and less than or equal to ($\pi/2$ [rad]), and then provides a combined amount to the phase difference as a phase offset.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described with reference to the drawings.

First Embodiment

Figure 1:
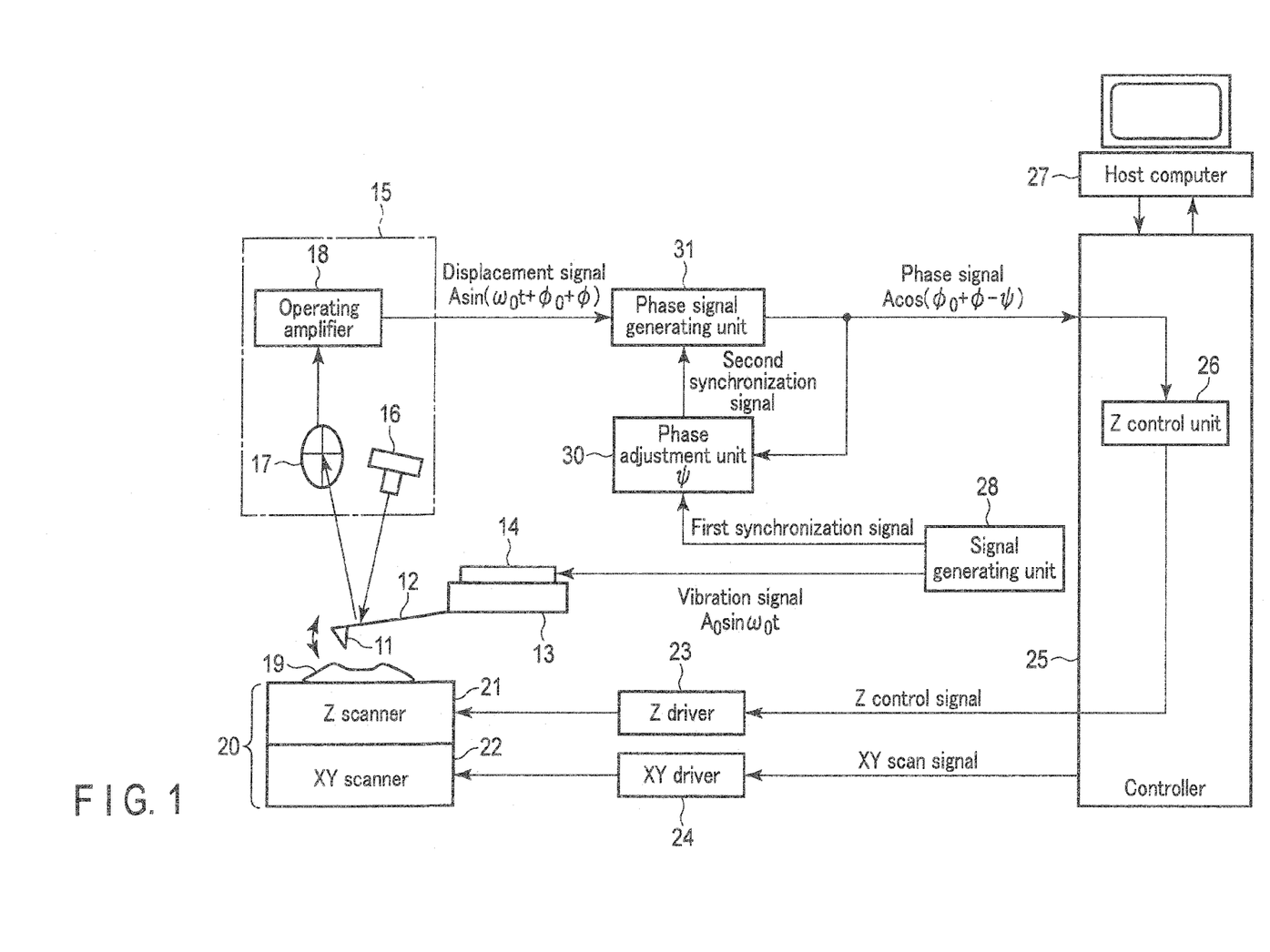
FIG. 1 shows the construction of a scanning probe microscope according to a first embodiment.

The construction of a scanning probe microscope according to the present embodiment is shown in FIG. 1. As shown in FIG. 1, the scanning probe microscope includes a cantilever 12 having a probe 11 at its free end. This cantilever 12 can be held by a holder 13 so as to confront a sample 19.

The scanning probe microscope also includes a displacement detection unit 15 to detect the displacement of the cantilever 12 and output a displacement signal indicating the displacement. The displacement detection unit 15 is configured by an optical-lever-type optical displacement sensor, and comprises a laser light source 16 to apply collected laser light to the rear surface of the cantilever 12, a divided detector 17 to receive the laser light reflected from the rear surface of the cantilever 12, and an operating amplifier to generate the displacement signal of the cantilever 12 from the output of the divided detector 17.

The scanning probe microscope also includes a vibration unit 14 to vibrate the cantilever 12 on the basis of a vibration signal, and a signal generating unit 28 to supply the vibration signal to the vibration unit 14. The vibration unit 14 is provided in, for example, the holder 13. The vibration unit 14 is configured by, for example, a piezoelectric element, and can vibrate the cantilever 12 at a frequency near a mechanical resonance frequency with predetermined amplitude. The signal generating unit 28 outputs the vibration signal, and also outputs a first synchronization signal synchronized with the vibration signal. This first synchronization signal may comprise, for example, a square-wave signal (logic signal) having the same frequency and the same phase as the vibration signal.

Figure 2:
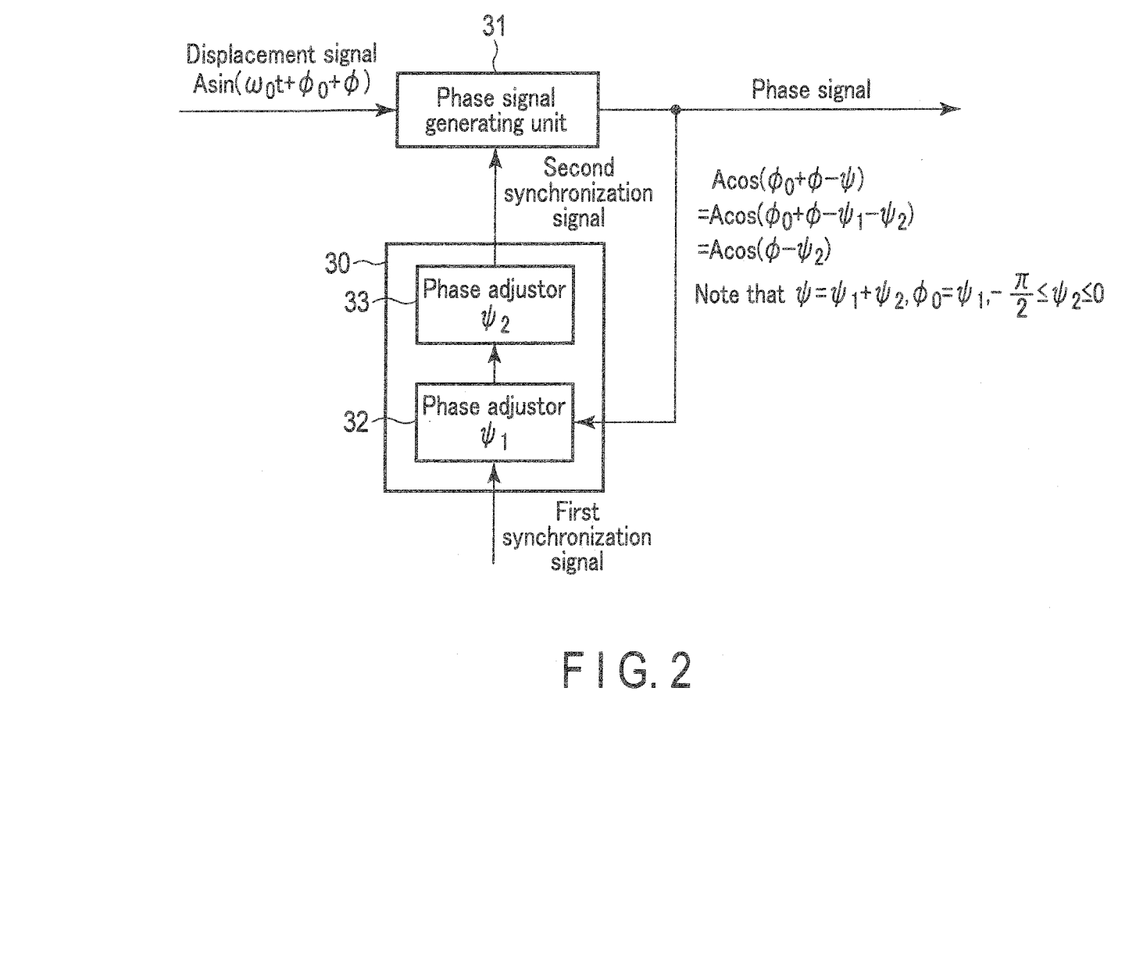
FIG. 2 shows the construction of a phase adjustment unit according to the first embodiment.

The scanning probe microscope also includes a phase adjustment unit 30 and a phase signal generating unit 31. The phase adjustment unit 30 provides a predetermined phase offset to the phase of the first synchronization signal supplied from the signal generating unit 28, and generates a second synchronization signal and then supplies the second synchronization signal to the phase signal generating unit 31. The phase signal generating unit 31 generates and outputs a phase signal including information regarding the phase difference between the displacement signal of the cantilever 12 supplied from the displacement detection unit 15 and the second synchronization signal supplied from the phase adjustment unit 30, i.e., information including the phase difference between the displacement signal of the cantilever 12 and the first synchronization signal and the phase offset. This phase signal is supplied to the phase adjustment unit 30, and used as a reference signal to generate the second synchronization signal. The construction of the phase adjustment unit 30 is shown in FIG. 2. As shown in FIG. 2, the phase adjustment unit 30 comprises a phase adjustor 32 and a phase adjustor 33. That is, the phase adjustment unit 30 comprises a two-stage phase adjustment function.

The scanning probe microscope also includes a scan unit 20 to three-dimensionally relatively move the sample 19 and the probe 11. The scan unit 20 comprises a Z scanner 21 and an XI' scanner 22. The Z scanner 21 is disposed on the XY scanner 22, and the sample 19 may be mounted on the Z scanner 21 through an unshown sample stage. The Z scanner 21 is driven by a Z driver 23, and can move the sample 19 relative to the probe 11 in a Z-direction. The XY scanner 22 is driven by an XY driver 24, and can move the sample 19 relative to the probe 11 in an XY-direction.

The scanning probe microscope also includes a controller 25 to control the Z driver 23 and the XI' driver 24, and a host computer 27 to form an image of the surface of the sample 19. The controller 25 can generate an XY scan signal to two-dimensionally scan the probe 11 along the surface of the sample 19, and a Z control signal to control the distance between the probe 11 and the sample 19. The controller 25 includes a Z control unit 26 to generate a Z control signal from the phase signal. The host computer 27 can form the image of the surface of the sample 19 by using the XY scan signal and the Z control signal generated in the controller 25.

Here, the flows of the signals are described in detail.

Suppose that the vibration signal is $A_0 \sin \omega_0 t$, wherein $A_0$ is the amplitude of the vibration signal, $\omega_0$ is the angular frequency of the vibration signal, and t is a time. If the resonant frequency of the cantilever 12 is $f_0$, $\omega_0$ has a value substantially equal to that of $2\pi \cdot f_0$.

Suppose that the first synchronization signal is, for example, a square-wave signal having the same frequency (i.e. the angular frequency $\omega_0$) and the same phase as the vibration signal.

Suppose that the displacement signal of the cantilever 12 is $A \sin(\omega_0 t + \phi_0 + \phi)$, wherein A is the amplitude of the displacement signal, $\phi_0$ is an initial phase difference of the displacement signal exiting in a condition where the probe 11 and the sample 19 are out of contact, and $\phi$ is a phase difference of the displacement signal that is generated because the probe 11 and the sample 19 have come into contact. This phase difference will be hereinafter referred to as a phase shift amount for convenience. $\phi$ is 0 in the condition where the probe 11 and the sample 19 are out of contact.

The phase adjustment unit 30 provides a phase offset $\psi$ to the phase of the first synchronization signal output from the signal generating unit 28. That is, the phase adjustment unit 30 shifts the phase of the first synchronization signal by $(+\psi)$. This is equivalent to providing a phase offset $(-\psi)$ to the phase difference between the displacement signal of the cantilever 12 and the first synchronization signal (i.e. the vibration signal). The phase signal generating unit 31 generates and outputs a phase signal including information regarding the displacement signal $A \sin(\omega_0 t + \phi_0 + \phi)$ of the cantilever 12 and the second synchronization signal (i.e. the first synchronization signal provided with the phase offset $\psi$) that is, $A \cos(\phi_0 + \phi - \psi)$.

The phase adjustment unit 30 provides a phase offset $\psi$ at two stages by the phase adjustor 32 and the phase adjustor 33. $\psi = \psi_1 + \psi_2$, wherein $\psi_1$ is the phase amount provided by the phase adjustor 32, and $\psi_2$ is the phase amount provided by the phase adjustor 33.

Specifically, in the condition where the probe 11 and the sample 19 are out of contact, that is, when $\phi=0$, the phase adjustor 32 provides the first synchronization signal with the phase amount $\psi_1$ ($=\phi_0$) that cancels the initial phase difference $\phi_0$ of the displacement signal exiting in the condition where the probe 11 and the sample 19 are out of contact. In this instance, the magnitude of $A \cos(\phi_0 + \phi - \psi)$, which is a phase signal, is $A \cos(0) = A$. In other words, the phase adjustor 32 provides the first synchronization signal with such a phase amount $\psi_1 = \phi_0$ that the magnitude of $A \cos(\phi_0 + \phi - \psi)$, which is the phase signal, is the maximum in the condition where the probe 11 and the sample 19 are out of contact. The phase adjustor 33 then provides a phase amount equal to or more than $(-\pi/2 \text{ [rad]})$ and less than or equal to $(0 \text{ [rad]})$ to the output of the phase adjustor 32. That is, $\psi_2$ is a predetermined amount that satisfies $(-\pi/2 \text{ [rad]}) \leq \psi_2 \leq (0 \text{ [rad]})$. In this instance, the phase signal output from the phase signal generating unit 31 is $A \cos\{\phi_0 + \phi - (\psi_1 + \psi_2)\} = A \cos(\phi - \psi_2)$, wherein $\psi_2$ is $(-\pi/2 \text{ [rad]}) \leq \psi_2 \leq (0 \text{ [rad]})$.

Figure 3A:
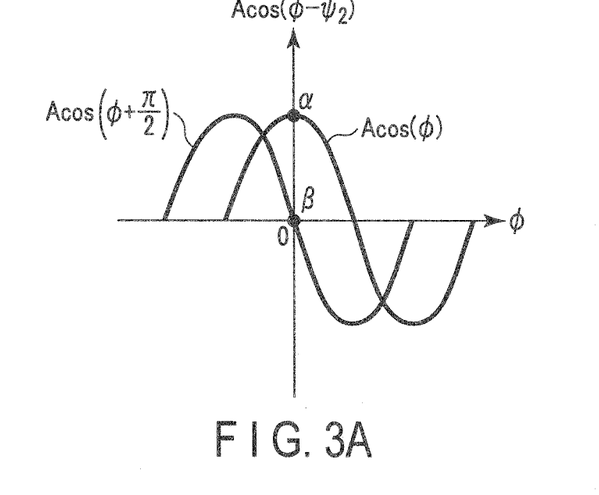
FIG. 3A shows a graph of A cos ($\phi$) and A cos ($\phi+\pi/2$)
Figure 3B:
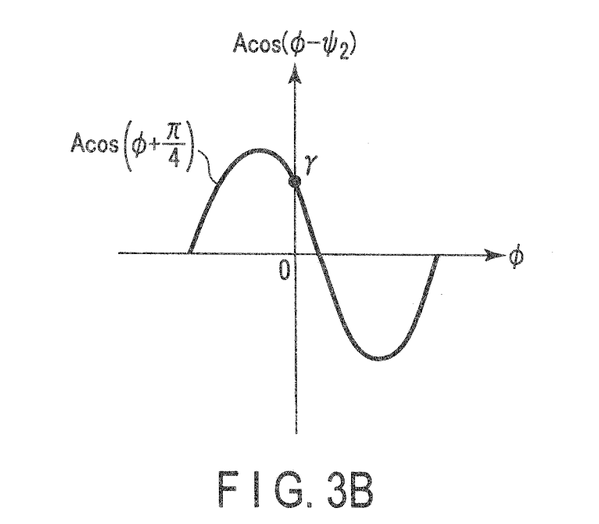
FIG. 3B shows a graph of A cos ($\phi+\pi/4$)

$A \cos(\phi - \psi_2)$ becomes a graph intervening between a graph $A \cos(\phi - \psi_2) = A \cos(\phi + \pi/2) = -A \sin(\phi)$ and a graph $A \cos(\phi - \psi_2) = A \cos(\phi)$ shown in FIG. 3A. FIG. 3B a graph between the two graphs shown in FIG. 3A, that is, a graph $A \cos(\phi - \psi_2) = A \cos(\phi + \pi/4)$ wherein $\psi_2 = -\pi/4$. An $\alpha$ point in the graph in FIG. 3A is a point of crossing a Y-axis when $\psi_2=0$, and a β point is a point of crossing the Y-axis when $\psi_2=-\pi/2$. A γ point in FIG. 3B is a point of crossing the Y-axis when $\psi_2=-\pi/4$.

As apparent from the graphs in FIG. 3A and FIG. 3B, the sensitivity to the change of the phase shift amount φ is the minimum (lowest) at the position of the α point. That is, when A cos (φ−$\psi_2$)=A cos (φ), the sensitivity to the phase shift amount (I) generated due to the contact between the probe 11 and the sample 19 is the minimum (lowest). At the position of the β point, the sensitivity to the change of the phase shift amount φ is the maximum (highest). That is, when A cos (φ−$\psi_2$)=A cos (φ+π/2)=−A sin(φ), the sensitivity to the phase shift amount φ generated due to the contact between the probe 11 and the sample 19 is the maximum (highest). At the position of the γ point, the sensitivity lies about substantially between those at the α point and the β point, to be precise, 1/√2 times as high as that at the β point. That is, when A cos (φ−$\psi_2$)=A cos (φ+π/4), the sensitivity to the phase shift amount φ generated due to the contact between the probe 11 and the sample 19 is substantially an intermediate sensitivity.

Here, A cos (φ−$\psi_2$) can be written as A cos (φ−$\psi_2$)=A cos (φ)cos (−$\psi_2$)−A sin(φ)sin(−$\psi_2$). cos(−$\psi_2$) and sin (−$\psi_2$) can be treated as constants.

According to this equation, A cos (φ−$\psi_2$) can be treated as the mixture of A cos (φ) and −A sin (φ). The constants of cos (−$\psi_2$) and sin (−$\psi_2$) determine the mixture ratio of A cos (φ) to −A sin (φ). For example, when $\psi_2=0$, the mixture ratio of A cos (φ) to −A sin(φ) is 1:0. When $\psi_2=-\pi/2$, the mixture ratio of A cos (φ) to −A sin (φ) is 0:1. When $\psi_2=-\pi/4$, the mixture ratio of A cos (φ) to −A sin(φ) is 1:1.

When the part to be measured is hard, the displacement signal of the cantilever 12 changes more in amplitude than in phase. This amplitude decreases as the repulsion operating between the sample 19 and the probe 11 increases. In contrast, when the part to be measured is soft, the displacement signal of the cantilever 12 changes more in phase than in amplitude. This phase advances as the repulsion operating between the sample 19 and the probe 11 increases (shifts in a direction of +φ).

Therefore, the change amount of a signal in the case where the part to be measured is hard, that is, in the case where the change in amplitude is greater than the phase shift amount φ can be cos φ≈1 when the change of φ is small, so that A cos φ≈A, that is, A cos φ can be considered to be the same as A. Therefore, A cos (φ) greatly changes, but the change of −A sin (φ) is small. When the part to be measured is soft, −A sin (φ) greatly changes, but the change of A cos (φ) is small.

In this way, when the part to be measured is hard, A cos (φ−$\psi_2$), which is the phase signal, becomes A cos (φ) if $\psi_2$ is adjusted so that $\psi_2$=2. Therefore, the repulsion operating between the sample 19 and the probe 11 can be detected with high sensitivity.

When the part to be measured is soft, Aces (φ−$\psi_2$), which is the phase signal, becomes −A sin (φ) if $\psi_2$ is adjusted so that $\psi_2=-\pi/2$. Therefore, the repulsion operating between the sample 19 and the probe 11 can be detected with high sensitivity.

When the part to be measured has hard parts and soft parts at about the same ratio, A cos (φ−$\psi_2$), which is the phase signal, becomes (1/√2)×{A cos (φ)−A sin (φ)} if $\psi_2$ is adjusted so that $\psi_2=-\pi/4$. Therefore, the repulsion operating between the sample 19 and the probe 11 can be detected in both the hard parts and soft parts with high sensitivity.

As described above, according to the first embodiment of the present invention, a mixed signal comprising A cos (φ) and −A sin (φ) can be generated by the phase adjustment unit 30, and their mixture ratio can be adjusted. For a sample having more hard parts, $\psi_2$ has only to be brought closer to 0. For a sample having more soft parts, $\psi_2$ has only to be brought closer to −π/2. For a sample having hard parts and soft parts at about the same ratio, $\psi_2$ has only to be brought closer to −π/4. As a result, it is possible to accurately measure the surface shape of a sample in which hard parts and soft parts are mixed. At any ratio between the hard parts and the soft parts, accurate measurement is possible owing to the adjustment by the phase adjustment unit 30.

According to the first embodiment of the present invention, anything can be used for the adjustment operation by the phase adjustment unit 30; for example, an analog circuit, a digital circuit, or software.

Although the phase adjustment is made in the first synchronization signal according to the first embodiment of the present invention, similar advantageous effects can also be obtained if the phase adjustment is made in the displacement signal. In this case, the phase offset to be provided to the displacement signal is (−ψ=−$\psi_1$−$\psi_2$).

Second Embodiment

Figure 4:
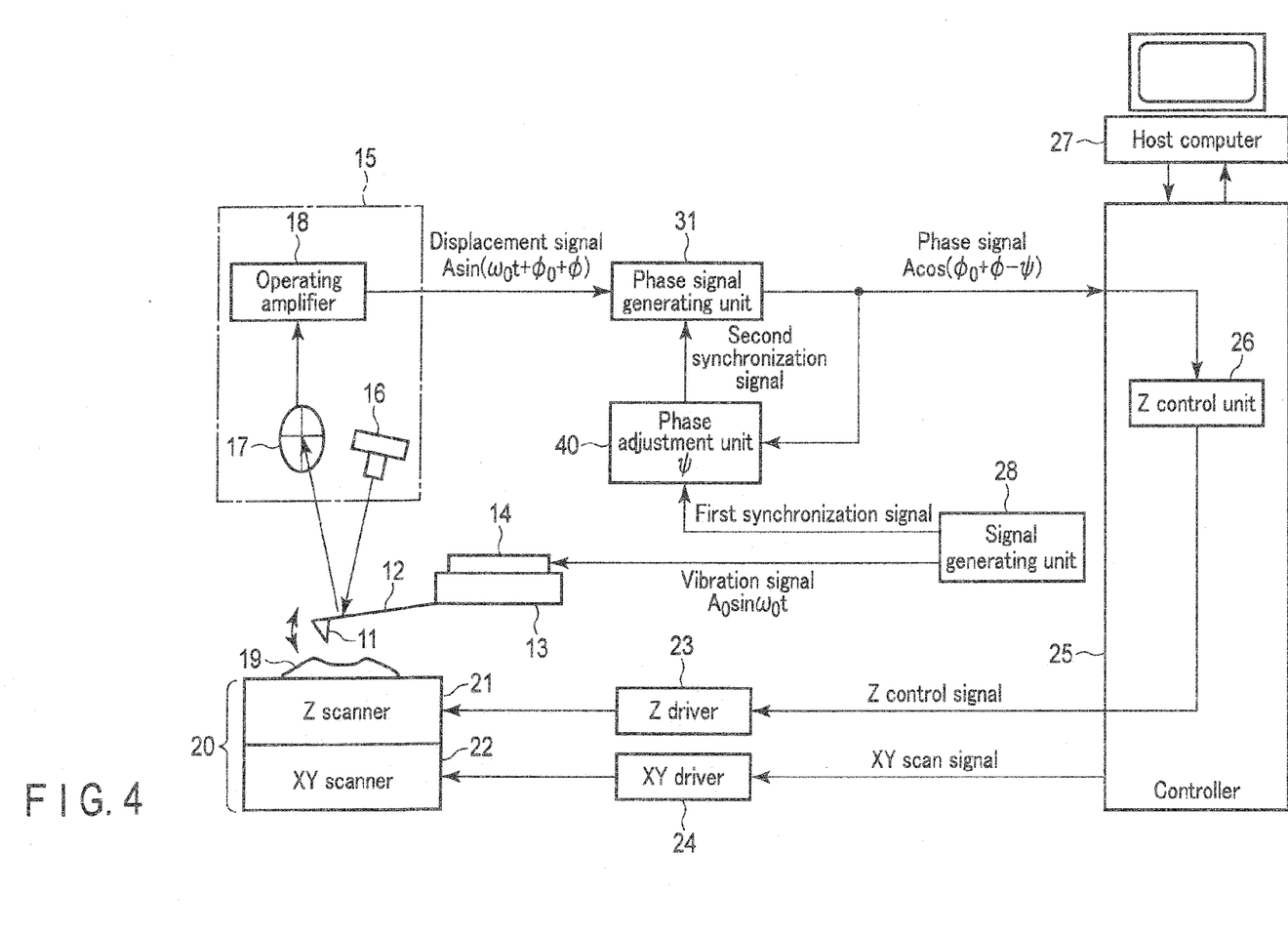
FIG. 4 shows the construction of a scanning probe microscope according to a second embodiment.

A scanning probe microscope according to the present embodiment shown in FIG. 4 is the same as the scanning probe microscope according to the first embodiment except that the construction of a phase adjustment unit 40 is different. Therefore, the construction and function of the phase adjustment unit 40 are only described here.

Figure 5:
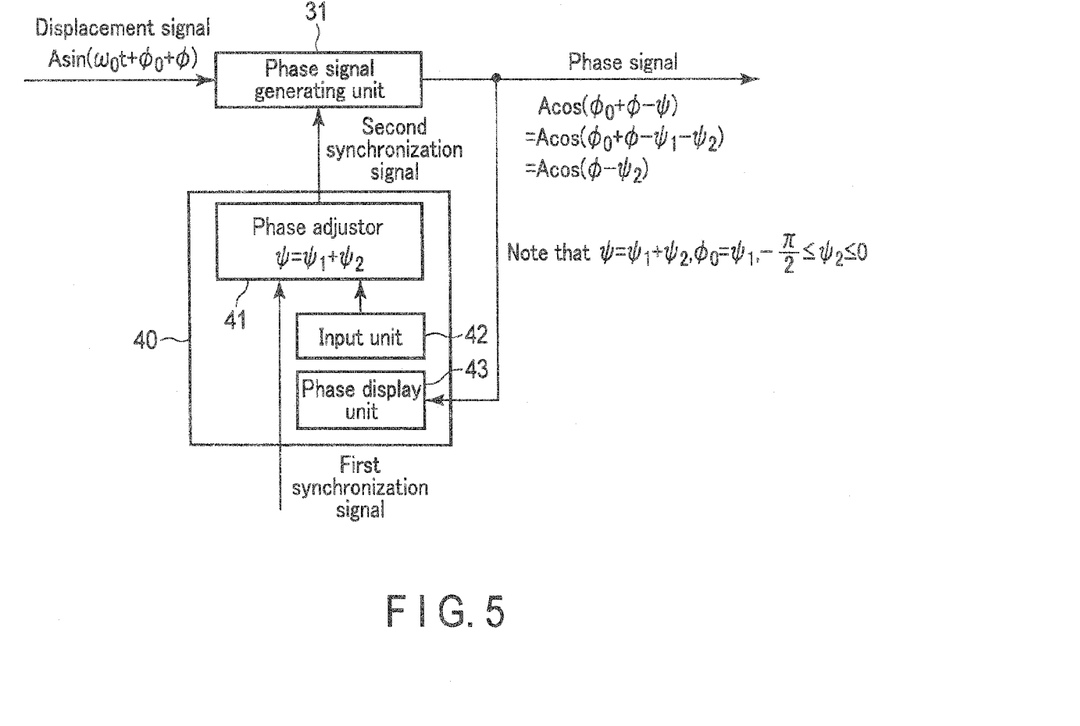
FIG. 5 shows the construction of a phase adjustment unit according to the second embodiment.

FIG. 5 shows the construction of the phase adjustment unit 40. As shown in FIG. 5, the phase adjustment unit 40 comprises a phase adjustor 41, an input unit 42, and a phase display unit 43.

The input unit 42 is for inputting information regarding the phase offset to be provided to the first synchronization signal, and comprises, for example, an interface of a numerical input type. The phase adjustor 41 is to provide the first synchronization signal with a phase amount corresponding to the information input to the input unit 42. The phase display unit 43 is to display the phase signal, and is, for example, a numerical value meter to indicate the intensity of the phase signal.

In the scanning probe microscope according to the present embodiment, while the intensity of the phase signal displayed on the phase display unit 43 is monitored, a phase amount that maximizes the phase signal in the condition where the probe 11 and the sample 19 are out of contact, that is, when φ=0, is input to the input unit 42. That is, the phase of the first synchronization signal is shifted by (φ₀), and a phase amount that cancels the initial phase difference of the displacement signal exiting in the condition where the probe 11 and the sample 19 are out of contact is input to the input unit 42. From this state, a phase amount equal to or more than (−π/2 [rad]) and less than or equal to (0 [rad]) is further added to the input unit 42. That is, a phase amount equal to the phase offset (ψ=$\psi_1$+$\psi_2$) to which the phase amount $\psi_1$ and the phase amount $\psi_2$ shown in the first embodiment are added is input to the input unit 42. The phase adjustor 41 then provides the phase offset (ψ=$\psi_1$+$\psi_2$) to the first synchronization signal in accordance with the phase amount input to the input unit 42.

Therefore, advantageous effects similar to those in the first embodiment can be obtained in the second embodiment.

Moreover, in the second embodiment, the intensity of the phase signal can be monitored, so that the phase can be intuitively adjusted.

Third Embodiment

Figure 6:
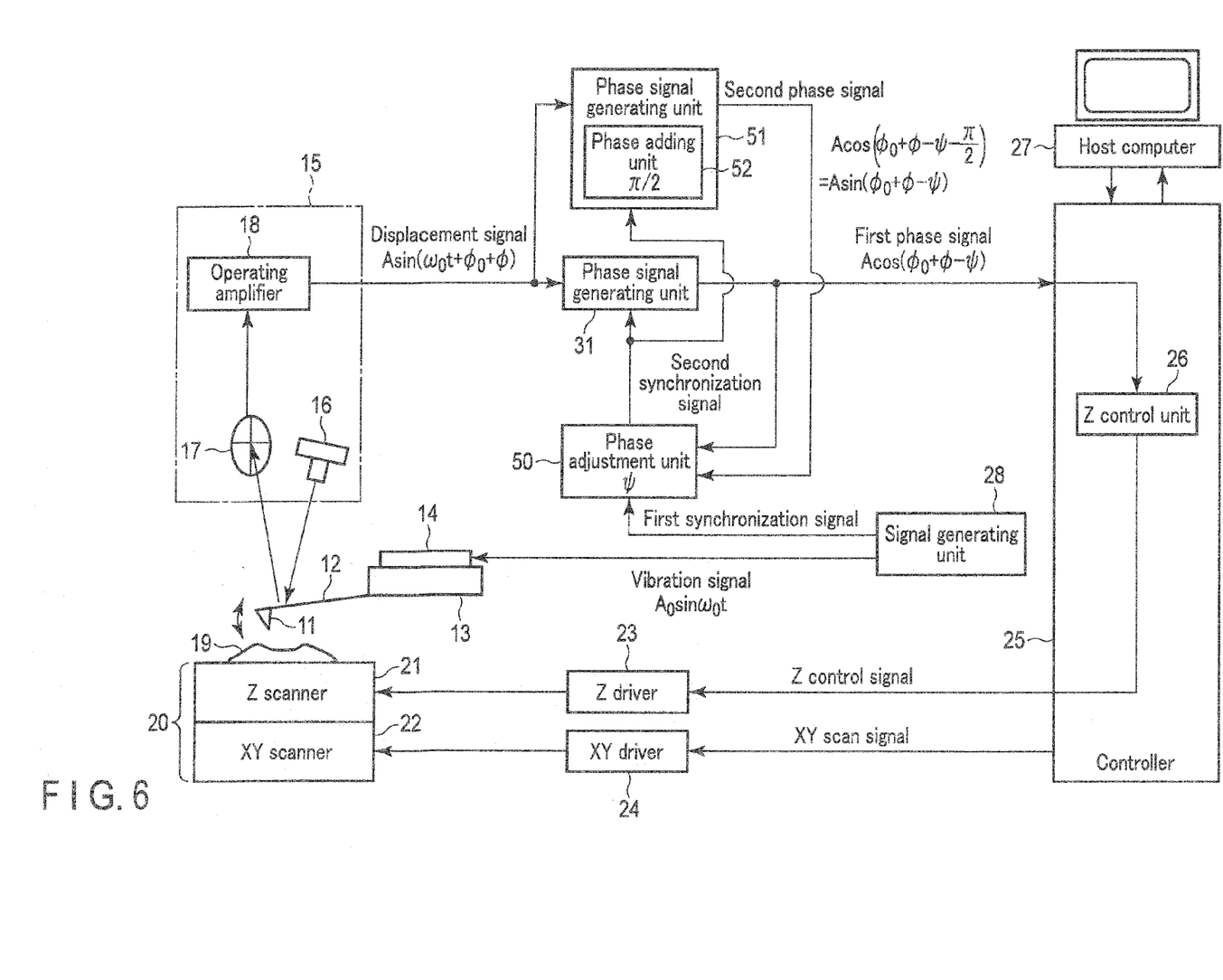
FIG. 6 shows the construction of a scanning probe microscope according to a third embodiment.

A scanning probe microscope according to the present embodiment shown in FIG. 6 is different from the scanning probe microscope according to the first embodiment in that the phase adjustment unit 30 is replaced by a phase adjustment unit 50 and in that a phase signal generating unit 51 is added. The construction is similar in other respect to that of the scanning probe microscope according to the first embodiment.

The phase adjustment unit 50 provides a predetermined phase offset to the phase of the first synchronization signal supplied from the signal generating unit 28, and generates a second synchronization signal and then supplies the second synchronization signal to the phase signal generating unit 31 and the phase signal generating unit 51.

The phase signal generating unit 51 includes a phase adding unit 52. The phase adding unit 52 adds a phase amount ($\pi/2$ [rad]) to the second synchronization signal supplied from the phase adjustment unit 50.

The phase signal generating unit 51 generates and outputs a second phase signal including information regarding the phase difference between the displacement signal of the cantilever 12 supplied from the displacement detection unit 15 and the second synchronization signal to which a phase amount ($\pi/2$) is added, i.e., all information including the phase difference between the displacement signal of the cantilever 12 and the first synchronization signal, the phase offset provided to the first synchronization signal by the phase adjustment unit 50, and the phase amount ($\pi/2$) provided to the second synchronization signal by the phase adding unit 52. This second synchronization signal is equivalent to the first synchronization signal in which the phase is delayed by ($\pi/2$).

This second synchronization signal is supplied to the phase adjustment unit 50 together with a first phase signal, and used as a reference signal to generate the second synchronization signal.

Here, the flows of the signals are described in detail.

Suppose that the vibration signal is $A_0 \sin \omega_0 t$, wherein $A_0$ is the amplitude of the vibration signal, $\omega_0$ is the angular frequency of the vibration signal, and t is a time. If the resonant frequency of the cantilever 12 is $f_0$, $\omega_0$ has a value substantially equal to that of $2\pi \cdot f_0$.

Suppose that the first synchronization signal is, for example, a square-wave signal having the same frequency (i.e. the angular frequency $\omega_0$) and the same phase as the vibration signal.

Suppose that the displacement signal of the cantilever 12 is $A \sin (\omega_0 t + \phi_0 + \phi)$, wherein A is the amplitude of the displacement signal, $\phi_0$ is an initial phase difference of the displacement signal exiting in the condition where the probe 11 and the sample 19 are out of contact, and $\phi$ is a phase difference of the displacement signal which is generated because the probe 11 and the sample 19 have come into contact. This phase difference will be hereinafter referred to as a phase shift amount for convenience. $\phi$ is 0 in the condition where the probe 11 and the sample 19 are out of contact.

The phase adjustment unit 50 provides a phase offset to the phase of the first synchronization signal supplied from the signal generating unit 28. That is, the phase adjustment unit 50 shifts the phase of the first synchronization signal by ($+\psi$). This is equivalent to providing a phase offset ($-\psi$) to the phase difference between the displacement signal of the cantilever 12 and the first synchronization signal (i.e. the vibration signal).

The phase signal generating unit 31 generates and outputs a first phase signal, that is, A cos ($\phi_0+\phi-\psi$) including information regarding the phase difference between the displacement signal A sin ($\psi_0 t+\phi_0+\phi$) of the cantilever 12 and the second synchronization signal (i.e. the first synchronization signal provided with the phase offset $\psi$).

The phase signal generating unit 51 generates and outputs a second phase signal including information regarding the phase difference between the displacement signal A sin ($\omega_0 t+\phi_0+\phi$) of the cantilever 12 and the second synchronization signal (i.e. the first synchronization signal provided with the phase offset $\psi$) to which the phase amount ($\pi/2$) is added, that is, A cos ($\phi_0+\phi-\pi/2$)=A sin ($\phi_0+\phi-\psi$).

The phase adjustment unit 50 provides a predetermined phase offset to the first synchronization signal by referring to the first phase signal and the second phase signal.

Specifically, the phase adjustment unit 50 provides the first synchronization signal with such a phase offset that both A cos ($\phi_0+\phi-\psi$) and A sin ($\phi_0+\phi-\psi$) are 0 or more, that is, both A cos ($\phi_0-\psi$) and A sin ($\phi_0-\psi$) are 0 or more in the condition where the probe 11 and the sample 19 are out of contact, that is, when $\phi=0$.

The range of ($\phi_0-\psi$) in which both A cos ($\phi_0-\psi$) and A sin ($\phi_0-\psi$) are 0 or more is (0 [rad])≤($\phi_0-\psi$)≤($\pi/2$ [rad]). $\psi=\phi_0$ when ($\phi_0-\psi$)=(0 [rad]). $\psi=\phi_0-\pi/2$ when ($\phi_0-\psi$)=($\pi/2$ [rad]). That is, the phase offset $\psi$ provided by the phase adjustment unit 50 is $\{\phi_0+(-\pi/2)\}\leq\psi\leq\{\phi_0+(0)\}$. This is totally equivalent to the phase offset ($\psi_1+\psi_2$) provided in the first embodiment.

That is, for a sample having more hard parts, $\psi$ may be adjusted so that A sin ($\phi_0-\psi$) is closed to 0, for example, so that $\psi=\phi_0$. For a sample having more soft parts, $\psi$ may be adjusted so that A cos ($\phi_0-\psi$) is closed to 0, for example, so that $\psi=\phi_0-\pi/2$. For a sample having hard parts and soft parts at about the same ratio, $\psi$ may be adjusted, for example, so that A cos ($\phi_0-\psi$) becomes equal to A sin ($\phi_0-\psi$), that is, so that $\psi=\phi_0-\pi/4$.

Therefore, according to the third embodiment of the present invention, advantageous effects similar to those in the first embodiment can be obtained.

In the third embodiment, the two-stage adjustment used in the first embodiment is not needed, and the phase can be easily adjusted.

Fourth Embodiment

Figure 7:
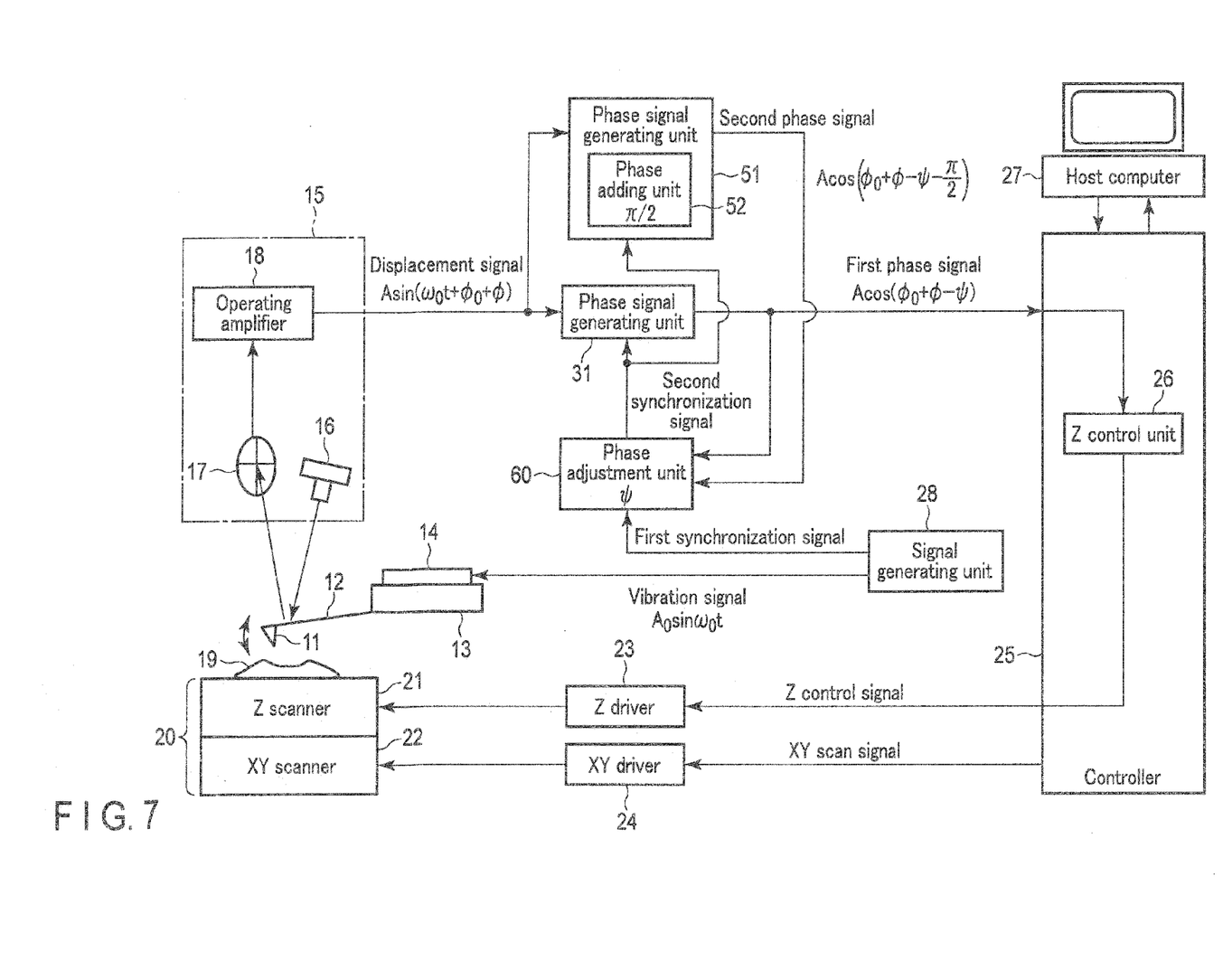
FIG. 7 shows the construction of a scanning probe microscope according to a fourth embodiment.

A scanning probe microscope according to the present embodiment shown in FIG. 7 is the same as the scanning probe microscope according to the third embodiment except that the construction of a phase adjustment unit 60 is different. Therefore, the construction and function of the phase adjustment unit 60 are only described here.

Figure 8:
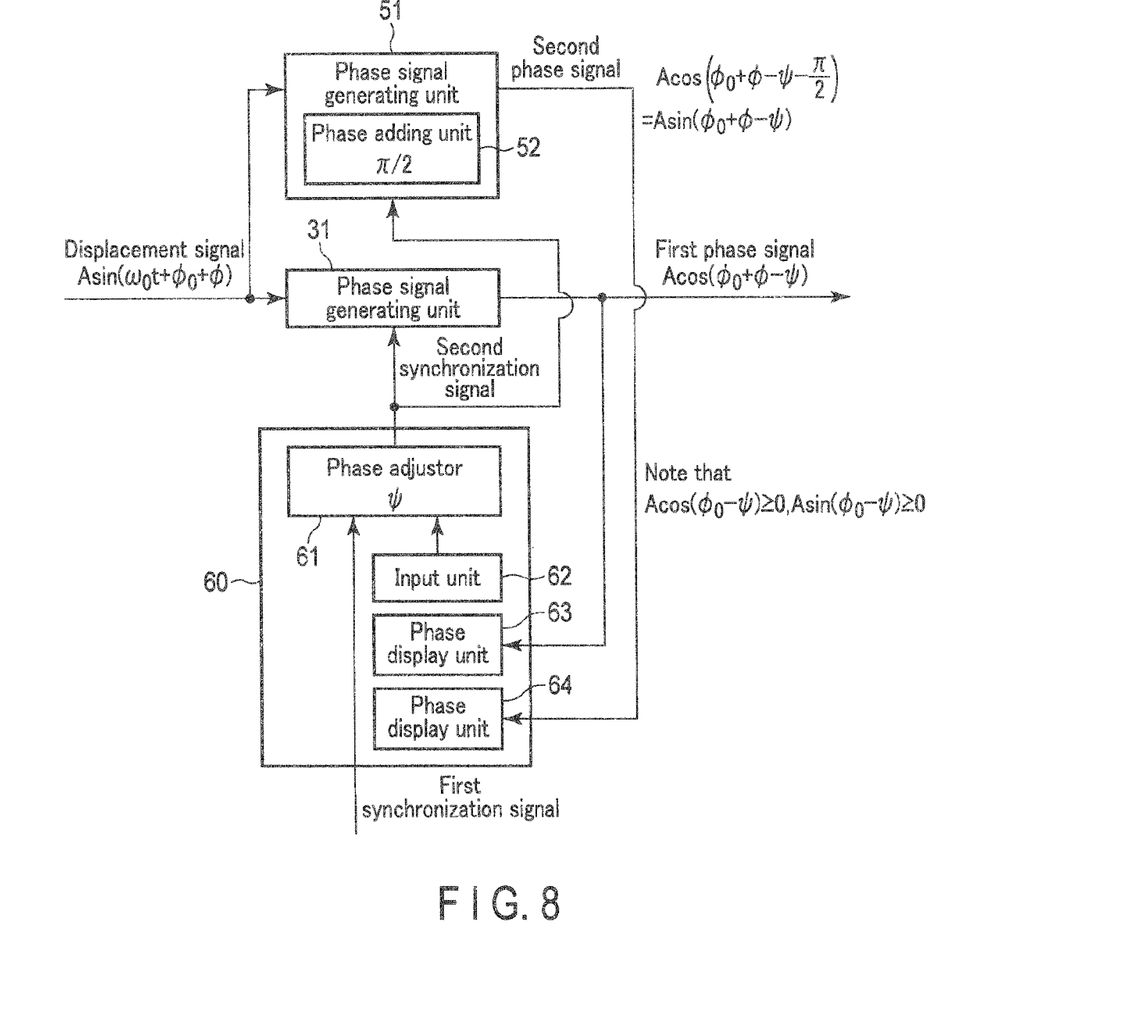
FIG. 8 shows the construction of a phase adjustment unit according to the fourth embodiment.

FIG. 8 shows the construction of the phase adjustment unit 60. As shown in FIG. 8, the phase adjustment unit 60 comprises a phase adjustor 61, an input unit 62, a phase display unit 63, and a phase display unit 64.

The input unit 62 is for inputting information regarding the phase offset to be provided to the first synchronization signal, and comprises, for example, an interface of a numerical input type. The phase adjustor 61 is to provide the first synchronization signal with a phase amount corresponding to the information input to the input unit 62. The phase display unit 63 is a numerical value meter to indicate the intensity of the first phase signal. The phase display unit 64 is to display the second phase signal, and is, for example, a numerical value meter to indicate the intensity of the second phase signal.

In the scanning probe microscope according to the present embodiment, while the intensity of the first phase signal displayed on the phase display unit 63 and the intensity of the second phase signal displayed on the phase display unit 64 are monitored, such a phase amount that each of the first phase signal and the second phase signal are 0 or more in the condition where the probe 11 and the sample 19 are out of contact, that is, when $\phi=0$, is input to the input unit 62. That is, a phase amount equal to the phase offset ($\psi=\psi_1+\psi_2$) to which the phase amount $\psi_1$ and the phase amount $\psi_2$ shown in the first embodiment are added is input to the input unit 62. The phase adjustor 61 then provides the phase offset equal to ($\psi=\psi_1+\psi_2$) to the first synchronization signal in accordance with the phase amount input to the input unit 62.

Specifically, for a sample having more hard parts, the phase adjustment unit 60 provides a phase offset ($\psi=\psi_1+\psi_2=\phi_0$) to the first synchronization signal when the intensity of the first phase signal is adjusted to the maximum and the intensity of the second phase signal is adjusted to 0. For a sample having more soft parts, the phase adjustment unit 60 provides a phase offset ($\psi+\psi_1+\psi_2=\phi_0-\pi/2$) to the first synchronization signal when the intensity of the first phase signal is adjusted to 0 and the intensity of the second phase signal is adjusted to the maximum. For a sample having hard parts and soft parts at about the same ratio, the phase adjustment unit 60 provides a phase offset ($\psi=\psi_1+\psi_2=\phi_0-\pi/4$) to the first synchronization signal when the intensity of the first phase signal and the intensity of the second phase signal are equally adjusted.

Therefore, according to the fourth embodiment, advantageous effects similar to those in the first embodiment can be obtained.

Moreover, in the fourth embodiment, the intensity of the first phase signal and the intensity of the second phase signal can be respectively monitored, so that the phase can be more intuitively adjusted than in the third embodiment. It is also possible to easily cope with the variations of the first phase signal and the second phase signal caused by a thermal drift.

Fifth Embodiment

Figure 9:
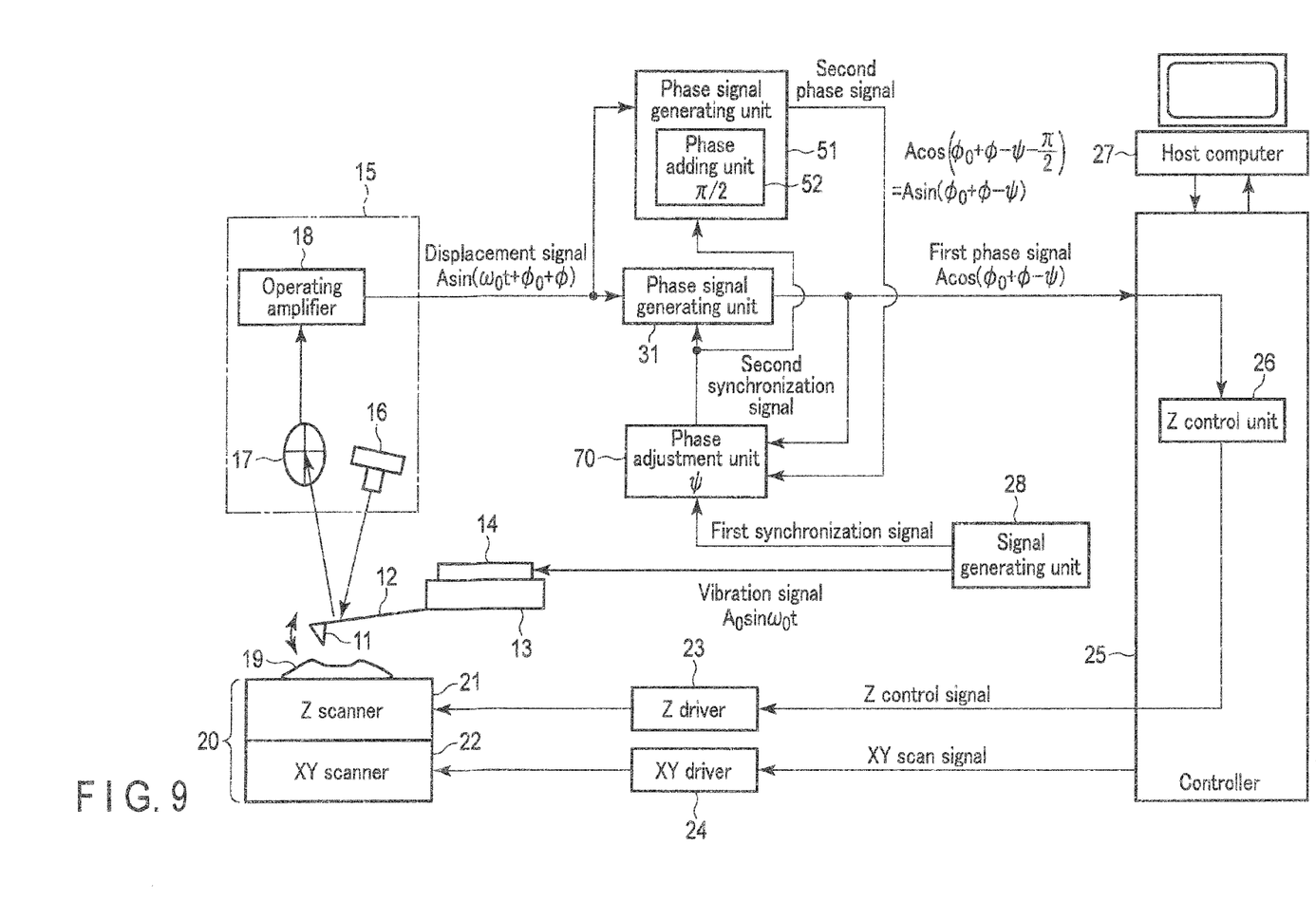
FIG. 9 shows the construction of a scanning probe microscope according to a fifth embodiment.

A scanning probe microscope according to the present embodiment shown in FIG. 9 is the same as the scanning probe microscope according to the third embodiment except that the construction of a phase adjustment unit 70 is different. Therefore, the construction and function of the phase adjustment unit 70 are only described here.

Figure 10:
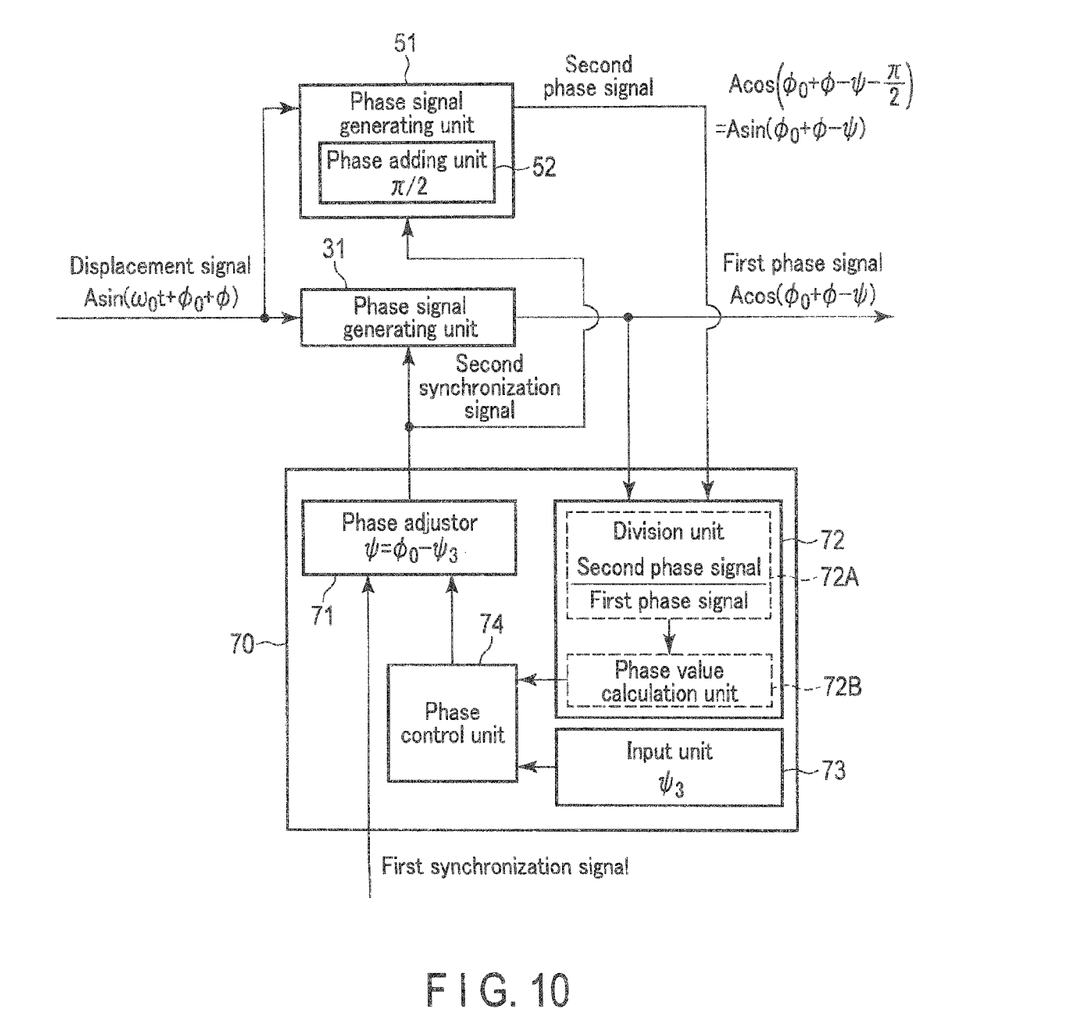
FIG. 10 shows the construction of a phase adjustment unit according to the fifth embodiment.

FIG. 10 shows the construction of the phase adjustment unit 70. As shown in FIG. 10, the phase adjustment unit 70 comprises a phase adjustor 71, a phase value detection unit 72, an input unit 73, and a phase control unit 74. The phase value detection unit 72 comprises a division unit 72A and a phase value calculation unit 72B.

The first phase signal and the second phase signal are supplied to the division unit 72A where (second phase signal/first phase signal) is calculated. The phase value calculation unit 72B calculates a phase value of (second phase signal/first phase signal) calculated in the division unit 72A. For example, if the first phase signal and the second phase signal are A cos ($\theta_2$) and A sin ($\theta_2$), respectively, the division unit 72A calculates (second phase signal/first phase signal), that is, tan ($\theta_2$). The phase value calculation unit 72B then calculates a phase value, that is, ($\theta_1$) of tan ($\theta_2$), which is (second phase signal/first phase signal). Therefore, the phase value detection unit 72 can find the phase value of the first phase signal.

The input unit 73 is to indicate a phase offset to be provided to the first synchronization signal such that the phase value of the first phase signal when the probe 11 and the sample 19 are out of contact are a desired value. A predetermined phase offset is input to the input unit 73 by, for example, an interface of a numerical input type.

The phase control unit 74 is to compare the phase value of the first phase signal found by the phase value detection unit 72 with the phase amount input to the input unit 73 when the probe 11 and the sample 19 are out of contact, and to find such a phase offset that the phase value and the phase amount may correspond to each other.

The phase adjustor 71 is to provide the phase offset found by the phase control unit 74 to the first synchronization, signal.

Here, the flows of the signals are described in detail.

Suppose that the vibration signal is $A_0 \sin \omega_0 t$, wherein $A_0$ is the amplitude of the vibration signal, $\omega_0$ is the angular frequency of the vibration signal, and t is a time. If the resonant frequency of the cantilever 12 is $f_0$, $\omega_0$ has a value substantially equal to that of $2\pi \cdot f_0$.

Suppose that the first synchronization signal is, for example, a square-wave signal having the same frequency (i.e. the angular frequency $\omega_0$) and the same phase as the vibration signal.

Suppose that the displacement signal of the cantilever 12 is A sin ($\omega_0 t+\phi_0+\phi$), wherein A is the amplitude of the displacement signal, $\phi_0$ is an initial phase difference of the displacement signal exiting in the condition where the probe 11 and the sample 19 are out of contact, and $\phi$ is a phase difference of the displacement signal which is generated because the probe 11 and the sample 19 have come into contact. This phase difference will be hereinafter referred to as a phase shift amount for convenience. $\phi$ is 0 in the condition where the probe 11 and the sample 19 are out of contact.

The phase adjustment unit 70 provides a phase offset to the phase of the first synchronization signal output from the signal generating unit 28. That is, the phase adjustment unit 70 shifts the phase of the first synchronization signal by ($+\psi$). This is equivalent to providing a phase offset ($-\psi$) to the phase difference between, the displacement signal of the cantilever 12 and the first synchronization signal (i.e. the vibration signal).

The phase signal generating unit 31 generates and outputs a first phase signal including information regarding the phase difference between the displacement signal A sin ($\omega_0 t+\phi_0+\phi$) of the cantilever 12 and the second synchronization signal (i.e. the first synchronization signal provided with the phase offset $\psi$), that is, A cos ($\phi_0+\phi-\psi$).

The phase signal generating unit 51 generates and outputs a second phase signal including information regarding the phase difference between the displacement signal A sin ($\omega_0 t+\phi_0+\phi$) of the cantilever 12 and the second synchronization signal (i.e. the first synchronization signal provided with the phase offset) $\psi$) to which the phase amount ($\pi/2$) is added, that is, A cos ($\phi_0+\phi-\psi-\pi 2$)=A sin ($\phi_0+\phi-\psi$).

In the phase adjustment unit 70, the division unit 72A first calculates (second phase signal/first phase signal), that is, A sin ($\phi_0+\phi-\psi$) /A cos ($\phi_0+\phi-\psi$)=tan ($\phi_0+\phi-\psi$). The phase value calculation unit 72B then calculates a phase value of tan ($\phi_0+\phi-\psi$), that is, ($\phi_0+\phi-\psi$). That is, the phase value detection unit 72 calculates ($\phi_0+\phi-\psi$). The calculated phase value ($\phi_0+\phi-\psi$) is supplied to the phase control unit 74. In the meantime, a phase amount $\psi_3$ is input to the input unit 73. Here, $\psi_3$ is $(0 \text{ [rad]}) \leq \psi_3 \leq (\pi/2 \text{ [rad]})$. The input phase amount $\psi_3$ is supplied to the phase control unit 74. The phase control unit 74 compares $(\phi_0+\phi-\psi)=(\phi_0-\psi)$ with $\psi_3$ when the probe 11 and the sample 19 are out of contact, that is, when $\phi=0$, and the phase control unit 74 finds such a phase offset that $(\phi_0+\phi-\psi)=(\phi_0-\psi)$ and $\psi_3$ may correspond to each other. The found phase offset $\psi$ will be $\psi=\phi_0-\psi_3$ from $\phi_0-\psi=\psi_3$. The phase adjustor 71 then provides the phase offset $\psi=\phi_0-\psi_3$ found by the phase control unit 74 to the first synchronization signal.

Therefore, the first phase signal and the second phase signal in the condition where the probe 11 and the sample 19 are out of contact, that is, when $\phi=0$, are A cos $(\phi_0+\phi-\psi)$=A cos $(\psi_3)$ and A sin $(\phi_0+\phi-\psi)$=A sin $(\psi_3)$, respectively. Here, $\psi_3$ is $(0 \text{ [rad]}) \leq \psi_3 \leq (\pi/2 \text{ [rad]})$, so that the phase offset $\psi$ provided in the present embodiment is totally equivalent to the phase offset provided in the first embodiment and the third embodiment.

That is, for a sample having more hard parts, $\psi_3$ may be adjusted, for example, so that A sin $(\psi_3)$=0, that is, so that $\psi_3=0$. For a sample having more soft parts, $\psi_3$ may be adjusted, for example, so that A cos $(\psi_3)$=0, that is, so that $\psi_3=\pi/2$. For a sample having hard parts and soft parts at about the same ratio, $\psi_3$ may be adjusted, for example, so that A cos $(\psi_3)$ becomes equal to A sin$(\psi_3)$, that is, so that $\psi_3=\pi/4$.

Therefore, according to the fifth embodiment of the present invention, advantageous effects similar to those in the first embodiment and the third embodiment can be obtained.

In the fifth embodiment, the two-stage adjustment used in the first embodiment is not needed, and the phase can be easily adjusted.

While the embodiments of the present invention have been described so far with reference to the drawings, the present invention is not limited to these embodiments, and various modifications and changes may be made without departing from the spirit of the invention. The modifications and changes referred to here also include suitable combinations of the embodiments described above. The present invention can also include devices associated with the constructions described in the embodiments and methods associated with the operations described in the embodiments.

What is claimed is:

1. A scanning probe microscopy to acquire information regarding the surface of a sample by use of a cantilever having a probe at a free end thereof, the scanning probe microscopy comprising:
   vibrating the cantilever on the basis of a vibration signal;
   obtaining a displacement signal indicating the displacement of the cantilever;
   providing a phase offset to a phase difference between the vibration signal and the displacement signal;
   obtaining a first phase signal including information regarding the phase difference between the vibration signal and the displacement signal and the phase offset; and
   controlling the distance between the probe and the sample on the basis of the first phase signal,
   the providing the phase offset being providing a combined amount of a first phase amount that cancels an initial phase difference between the vibration signal and the displacement signal exiting in a condition where the probe and the sample are out of contact, and a second phase amount equal to or more than $(0 \text{ [rad]})$ and less than or equal to $(\pi/2 \text{ [rad]})$.

2. The scanning probe microscopy according to claim 1, wherein the obtaining the first phase signal includes obtaining cosine (cos) information regarding the phase difference between the vibration signal and the displacement signal and the phase offset, and
   the phase offset is a combined amount of a first phase amount in which the intensity of the first phase signal is the maximum in the condition where the probe and the sample are out of contact, and a second phase amount equal to or more than $(0 \text{ [rad]})$ and less than or equal to $(\pi/2 \text{ [rad]})$.

3. The scanning probe microscopy according to claim 1, further comprising obtaining a second phase signal that is delayed $(\pi/2 \text{ [rad]})$ in phase relative to the first phase signal,
   wherein the obtaining the first phase signal includes obtaining cosine (cos) information regarding the phase difference between the vibration signal and the displacement signal and the phase offset,
   the obtaining the second phase signal includes obtaining sine (sin) information regarding the phase difference between the vibration signal and the displacement signal and the phase offset, and
   the phase offset is a phase amount in which both the intensity of the first phase signal and the intensity of the second phase signal are 0 or more in the condition where the probe and the sample are out of contact.

4. A scanning probe microscope to detect an interaction between a probe provided at a free end of a cantilever and a sample, the scanning probe microscope comprising:
   a vibration unit to vibrate the cantilever on the basis of a vibration signal;
   a displacement detection unit to detect the displacement of the cantilever and output a displacement signal indicating the displacement;
   a phase adjustment unit to provide a phase offset to a phase difference between the vibration signal and the displacement signal;
   a phase signal generating unit to generate a first phase signal including information regarding the phase difference between the vibration signal and the displacement signal and the phase offset; and
   a control unit to control the distance between the probe and the sample on the basis of the first phase signal,
   the phase adjustment unit combining a first phase amount that cancels an initial phase difference between the vibration signal and the displacement signal exiting in a condition where the probe and the sample are out of contact, with a second phase amount equal to or more than $(0 \text{ [rad]})$ and less than or equal to $(\pi/2 \text{ [rad]})$, and the phase adjustment unit then providing a combined amount to the phase difference as a phase offset.

5. The scanning probe microscope according to claim 4, wherein the first phase signal includes cosine (cos) information regarding the phase difference between the vibration signal and the displacement signal and the phase offset, and
   the phase offset is a combined amount of a first phase amount in which the intensity of the first phase signal is the maximum in the condition where the probe and the sample are out Of contact, and a second phase amount equal to or more than $(0 \text{ [rad]})$ and less than or equal to $(\pi/2 \text{ [rad]})$.

6. The scanning probe microscope according to claim 5, wherein the first phase signal in the condition where the probe and the sample are out of contact is A cos $(\phi_0-\psi)$ in which is an amplitude value of the displacement signal, $\phi_0$ is the initial phase difference, and $(-\psi)$ is the phase offset, and the phase offset $(-\psi)$ is a combined amount of a first phase amount $(-\phi_0)$ in which the intensity of the first phase signal is the maximum in the condition where the probe and the sample are out of contact, and a second phase amount equal to or more than (0 [rad]) and less than or equal to ($\pi/2$ [rad]).

7. The scanning probe microscope according to claim 4, wherein the phase adjustment unit comprises an input unit to allow information regarding the phase offset to be input, and a phase display unit to display the first phase signal, and the phase adjustment unit provides the phase offset to the phase difference in accordance with the information regarding the phase offset input by the input unit.

8. The scanning probe microscope according to claim 4, further comprising a second phase signal generating unit to generate a second phase signal, the second phase signal including information regarding the phase difference between the vibration signal and the displacement signal and the phase offset, the second phase signal being delayed ($\pi/2$ [rad]) in phase relative to the first phase signal, wherein the first phase signal includes cosine (cos) information regarding the phase difference between the vibration signal and the displacement signal and the phase offset, the second phase signal includes sine (sin) information regarding the phase difference between the vibration signal and the displacement signal and the phase offset, and the phase offset is a phase amount in which both the intensity of the first phase signal and the intensity of the second phase signal are 0 or more in the condition where the probe and the sample are out of contact.

9. The scanning probe microscope according to claim B, wherein the first phase signal in the condition where the probe and the sample are out of contact is $A \cos (\phi_0-\psi)$ in which A is an amplitude value of the displacement signal, $\phi_0$ is the initial phase difference, and $(-\psi)$ is the phase offset, the second phase signal in the condition where the probe and the sample are out of contact is $A \cos (\phi_0-\psi-\pi/2) = A \sin (\phi_0-\psi)$, and the phase offset $(-\psi)$ is a phase amount in which both the intensity of the first phase signal $A \cos (\phi_0-\psi)$ and the intensity of the second phase signal $A \sin (\phi_0-\psi)$ are 0 or more in the condition where the probe and the sample are out of contact, that is, the phase offset $(-\psi)$ is a phase amount in which $(\phi_0-\psi)$ is equal to or more than (0 [rad]) and less than or equal to ($\pi/2$ [rad]).

10. The scanning probe microscope according to claim 8, wherein the phase adjustment unit comprises an input unit to allow information regarding the phase offset to be input, a first phase display unit to display the first phase signal, and a second phase display unit to display the second phase signal, and the phase adjustment unit provides the phase offset to the phase difference in accordance with the information regarding the phase offset input by the input unit.

11. The scanning probe microscope according to claim 4, further comprising a second phase signal generating unit to generate a second phase signal, the second phase signal including information regarding the phase difference between the vibration signal and the displacement signal and the phase offset, the second phase signal being delayed ($\pi/2$ [rad]) in phase relative to the first phase signal, wherein the first phase signal includes cosine (cos) information regarding the phase difference between the vibration signal and the displacement signal and the phase offset, the second phase signal includes sine (sin) information regarding the phase difference between the vibration signal and the displacement signal and the phase offset, the phase adjustment unit comprises an input unit to allow a phase amount equal to or more than (0 [rad]) and less than or equal to ($\pi/2$ [rad]) to be input, a phase value detection unit to find and output a phase value of the first phase signal on the basis of the first phase signal and the second phase signal, and a phase value control unit to compare the phase amount with the phase value in the condition where the probe and the sample are out of contact, and to find the phase offset such that the phase value corresponds to the phase amount, and the phase adjustment unit provides the phase offset obtained by the phase value control unit to the phase difference.

12. The scanning probe microscope according to claim 11, wherein the first phase signal in the condition where the probe and the sample are out of contact is $A \cos (\phi_0-\psi)$ in which A is an amplitude value of the displacement signal, $\phi_0$ is the initial phase difference, and $(-\psi)$ is the phase offset, the second phase signal in the condition where the probe and the sample are out of contact is $A \cos (\phi_0-\psi-\pi/2) = A \sin (\phi_0-\psi)$, the phase value detection unit divides the second phase signal by the first phase signal to find $\{A \sin (\phi_0-\psi)\}/\{A \cos (\phi_0-\psi)\} = \tan (\phi_0-\psi)$, and calculates a phase value $(\phi_0-\psi)$ of the first phase signal from $\tan (\phi_0-\psi)$, and the phase value control unit finds the phase offset such that the phase value $(\phi_0-\psi)$ of the first phase signal corresponds to the phase amount equal to or more than (0 [rad]) and less than or equal to ($\pi/2$ [rad]) input to the input unit, that is, the phase offset in which $(\phi_0-\psi)$ is equal to or more than (0 [rad]) and less than or equal to ($\pi/2$ [rad]).

* * * * *